(12) United States Patent
Sun et al.

(10) Patent No.: US 11,804,627 B2
(45) Date of Patent: Oct. 31, 2023

(54) BATTERY, POWER CONSUMPTION DEVICE, AND METHOD AND DEVICE FOR PRODUCING BATTERY

(71) Applicant: CONTEMPORARY AMPEREX TECHNOLOGY CO., LIMITED, Ningde (CN)

(72) Inventors: Zhanyu Sun, Fujian (CN); Yuepan Hou, Ningde (CN); Xiaoteng Huang, Ningde (CN); Peng Wang, Ningde (CN); Haiqi Yang, Ningde (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/981,536

(22) Filed: Nov. 7, 2022

(65) Prior Publication Data
US 2023/0268585 A1    Aug. 24, 2023

Related U.S. Application Data

(63) Continuation of application No. PCT/CN2022/077150, filed on Feb. 21, 2022.

(51) Int. Cl.
*H01M 10/6554* (2014.01)
*H01M 50/209* (2021.01)
(Continued)

(52) U.S. Cl.
CPC ..... *H01M 10/6554* (2015.04); *H01M 10/625* (2015.04); *H01M 10/6556* (2015.04); *H01M 50/209* (2021.01); *H01M 2220/20* (2013.01)

(58) Field of Classification Search
CPC ........... H01M 10/6554; H01M 10/625; H01M 10/6556; H01M 50/209; H01M 2220/20
See application file for complete search history.

(56) References Cited

U.S. PATENT DOCUMENTS

2012/0237805 A1* 9/2012 Abels ................ H01M 10/6567
228/136
2013/0022856 A1    1/2013 Michelitsch et al.
(Continued)

FOREIGN PATENT DOCUMENTS

CN    108879023 A    11/2018
CN    110380151 A    10/2019
(Continued)

OTHER PUBLICATIONS

International Search Report and Written Opinion dated Nov. 23, 2022 received in International Application No. PCT/CN2022/077150.
(Continued)

*Primary Examiner* — Kiran Quraishi Akhtar
(74) *Attorney, Agent, or Firm* — Scully, Scott, Murphy & Presser, P.C.

(57) ABSTRACT

Provided are a battery, a power consumption device, a method for producing a battery, and a device. The battery includes: a plurality of battery cells arranged along a first direction and a thermal management component extending along the first direction and being connected to a first wall of each battery cell among the plurality of battery cells, the thermal management component including a pair of heat conducting plates that are oppositely arranged along a second direction and a flow passage located between the pair of heat conducting plates, the flow passage being configured to accommodate a fluid to adjust temperatures of the battery cell, and the second direction being vertical to the first wall, where in the second direction, a thickness D of the heat conducting plate and a size H of the flow passage satisfy: $0.01 \leq D/H \leq 25$. Technical solutions of embodiments of the present application could enhance performance of batteries.

15 Claims, 8 Drawing Sheets

(51) Int. Cl.
*H01M 10/625* (2014.01)
*H01M 10/6556* (2014.01)

(56) References Cited

U.S. PATENT DOCUMENTS

| | | |
|---|---|---|
| 2013/0034754 A1 | 2/2013 | Michelitsch et al. |
| 2020/0227701 A1* | 7/2020 | Suzuki .............. H01M 10/6555 |
| 2020/0328385 A1 | 10/2020 | Hou et al. |
| 2022/0416343 A1* | 12/2022 | He ...................... H01M 50/276 |

FOREIGN PATENT DOCUMENTS

| | | | |
|---|---|---|---|
| CN | 209496928 U | 10/2019 | |
| CN | 111009629 * | 4/2020 | .......... H01M 10/613 |
| CN | 111009629 A | 4/2020 | |
| WO | 2016080696 A1 | 5/2016 | |
| WO | 2017064906 A1 | 4/2017 | |
| WO | 2021098440 A1 | 5/2021 | |

OTHER PUBLICATIONS

Extended European Search Report dated Jul. 7, 2023 received in European Patent Application No. EP 22719498.2.

\* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2022/077150, filed on Feb. 21, 2022, the disclosure of which is hereby incorporated by reference in its entirety.

TECHNICAL FIELD

The present application relates to the field of battery technologies, and in particular, to a battery, a power consumption device, and a method and device for producing a battery.

BACKGROUND

With the increasing environmental pollution, new energy industry has attracted more and more attention. In the new energy industry, battery technology is an important factor related to their development.

Energy density of the battery is an important parameter among performance of the battery. However, other performance parameters of the battery need to be considered when improving the energy density of the battery. Therefore, how to improve the performance of the battery is one urgent technical problem to be solved in the battery technology.

SUMMARY

The present application provides a battery, a power consumption device, and a method and device for producing a battery, which may improve energy density of the battery while ensuring thermal management in the battery, thereby improving performance of the battery.

In a first aspect, a battery is provided, including a plurality of battery cells arranged along a first direction; and a thermal management component, extending along the first direction and being connected to a first wall of each battery cell among the plurality of battery cells, the first wall being a wall that has the largest surface area of the battery cell, the thermal management component including a pair of heat conducting plates that are oppositely arranged along a second direction and a flow passage located between the pair of heat conducting plates, the flow passage being configured to accommodate a fluid to adjust a temperature of the battery cell, and the second direction being vertical to the first wall, where in the second direction, a thickness D of the heat conducting plate and a size H of the flow passage satisfy: $0.01 \leq D/H \leq 25$.

In an embodiment of the present application, in the battery, the thermal management component is provided to be connected to the first wall that has the largest surface area of each battery cell among a column of the plurality of battery cells arranged along the first direction, where the thermal management component includes a pair of heat conducting plates that are oppositely arranged along a second direction vertical to the first wall and a flow passage between the pair of heat conducting plates, and in the second direction, the thickness D of the heat conducting plate and the size H of the flow passage satisfy: $0.01 \leq D/H \leq 0.25$. In this way, there is no need to provide beams and other structures in the middle of the box body of the battery, which can maximize the space utilization rate inside the battery, thereby improving the energy density of the battery; besides, the use of the above thermal management component can also ensure the thermal management in the battery. Thus, technical solutions of the embodiments of the present application could ensure the thermal management in the battery while improving the energy density of the battery, thereby improving the performance of the battery.

In a possible implementation manner, the thickness D of the heat conducting plate and the size H of the flow passage satisfy: $0.05 \leq D/H \leq 15$ and further satisfy $0.1 \leq D/H \leq 1$, so as to better take into account space, strength and thermal management, thereby further improving the performance of the battery.

In a possible implementation manner, a size W of the thermal management component in the second direction is 0.3 to 100 mm. If W is too large, the thermal management component will take up too much space, and if W is too small, it will result in too low strength or too narrow flow passage and affect the thermal management performance. Therefore, when the total thickness W of the thermal management component is 0.3 to 100 mm, the thermal management component can take into account the space, the strength and the thermal management to ensure the performance of the battery.

In a possible implementation manner, the thickness D of the heat conducting plate is 0.1 to 25 mm. If the thickness D of the heat conducting plate is too large, the heat conducting plate will take up too much space and the thermal management component will not be able to give up the expansion space required by the battery cell, and if the D is too small, it will result in low strength. Therefore, when the thickness D of the heat conducting plate is 0.1 to 25 mm, the thermal management component can take into account the space, the strength and expansion requirements of the battery cell to ensure the performance of the battery.

In a possible implementation manner, the size H of the flow passage is 0.1 to 50 mm. In this way, the thermal management component can take into account the space, the strength and a thermal management performance to ensure the performance of the battery.

In a possible implementation manner, the size W of the thermal management component in the second direction and an area A of the first wall satisfy: $0.03 \text{ mm}^{-1} \leq W/A*1000 \leq 2 \text{ mm}^{-1}$. In this way, requirements on both the strength and the thermal management performance can be taken into account to ensure the performance of the battery.

In a possible implementation manner, the thermal management component further includes a rib provided between the pair of heat conducting plates, and the rib and the pair of heat conducting plates form the flow passage. The rib can increase the strength of the thermal management component.

In a possible implementation manner, an angle formed of the rib and the heat conducting plate is an acute angle. In this way, in the second direction, the thermal management component can have a relatively large space for compression, thereby providing a relatively larger space for the expansion of the battery cell.

In a possible implementation manner, a thickness X of the rib is not less than $(-0.0005*F+0.4738)$mm, where F is a tensile strength of a material of the rib. In order to meet stress requirements of thermal management component, materials with higher strength are selected, and the thickness X of the internal rib can be thinner, thereby saving the space and improving the energy density.

In a possible implementation manner, the battery cell includes two first walls that are oppositely arranged in the second direction and two second walls that are oppositely arranged in the first direction, where in the first direction, the second walls of two adjacent battery cells are opposite. In this way, the first wall with a large area is used to connect with the thermal management component, which is beneficial to heat exchange among the battery cells and ensures the performance of the battery.

In a possible implementation manner, the battery includes a plurality of columns of the plurality of battery cells arranged in the first direction and the plurality of thermal management components, where the plurality of columns of battery cells and the plurality of thermal management components are alternately arranged in the second direction.

In this way, the plurality columns of battery cells and the plurality of thermal management components are connected to each other to form as a whole that is accommodated in the box body, which can not only perform effectively thermal management of each column of battery cells, but ensure the overall structural strength of the battery, thereby improving the performance of the battery.

In a possible implementation manner, the thermal management component is bonded to the first wall.

In a second aspect, a power consumption device is provided, including: the battery in the above first aspect or any possible implementation manner of the first aspect, and the battery being configured to provide electric energy.

In a third aspect, a method for producing a battery is provided, including providing a plurality of battery cells arranged in a first direction; providing a thermal management component, the thermal management component extending along the first direction and being connected to a first wall of each battery cell among the plurality of battery cells, the first wall being a wall that has the largest surface area of the battery cell, the thermal management component including a pair of heat conducting plates that are oppositely arranged along a second direction and a flow passage located between the pair of heat conducting plates, the flow passage being configured to accommodate a fluid to adjust a temperature of the battery cell, and the second direction being vertical to the first wall, where in the second direction, a thickness D of the heat conducting plate and a size H of the flow passage satisfy: $0.01 \leq D/H \leq 25$.

In a fourth aspect, a device for producing a battery is provided, including a module for executing the method provided in the above third aspect.

In the technical solution of an embodiment of the present application, in the battery, the thermal management component is provided to be connected to the first wall that has the largest surface area of each battery cell among a column of the plurality of battery cells arranged along the first direction, where the thermal management component includes a pair of heat conducting plates that are oppositely arranged along a second direction of the first wall and a flow passage between the pair of heat conducting plates, and in the second direction, the thickness D of the heat conducting plate and the size H of the flow passage satisfy: $0.01 \leq D/H \leq 25$. In this way, there is no need to provide beams and other structures in the middle of the box body of the battery, which can maximize the space utilization rate inside the battery, thereby improving the energy density of the battery; besides, the use of the above thermal management component can also ensure the thermal management in the battery. Thus, technical solutions of the embodiments of the present application could ensure the thermal management in the battery while improving the energy density of the battery, thereby improving the performance of the battery.

BRIEF DESCRIPTION OF DRAWINGS

To describe the technical solutions in embodiments of the present application more clearly, the following briefly describes the accompanying drawings required for the embodiments of the present application. It is obvious that the accompanying drawings in the following description show merely some embodiments of the present application, and those of ordinary skill in the art may still derive other drawings from these accompanying drawings without creative efforts.

Figure 1:
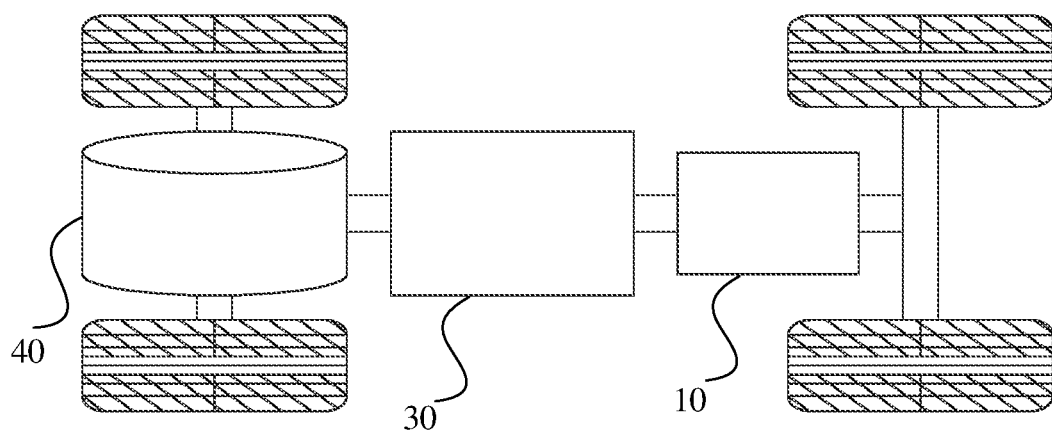
FIG. 1 is a schematic diagram of a vehicle according to an embodiment of the present application.

In the accompany drawings, the accompany drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present invention, that is, the present application is not limited to the described embodiments.

In the depiction of the present application, it is noted that unless otherwise defined, all technological and scientific terms used have the same meanings as those commonly understood by those skilled in the art to which the present application belongs. The terms used are merely for the purpose of describing specific embodiments, but are not intended to limit the present application. The terms "including" and "having" and any variations thereof in the specification and the claims of the present application as well as the brief description of the drawings described above are intended to cover non-exclusive inclusion. "A plurality of" means more than two; and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus may not be understood as a limitation the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment. Those skilled in the art understand, in explicit and implicit manners, that the embodiments described in the present application may be combined with other embodiments.

The terms representing directions in the following description are all directions shown in the drawings, and do not limit the specific structure of the present application. In the description of the present application, it should be further noted that unless otherwise explicitly specified and defined, the terms "mounting", "connecting" and "connection" should be understood in a broad sense; for example, they may be a fixed connection, a detachable connection, or an integrated connection; may be a direct connection and may also be an indirect connection through an intermediate medium, or may be communication between the interiors of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may include a battery pack, etc. The battery generally includes a box body for enclosing one or more battery cells. The box body may prevent liquid or other foreign matters from affecting the charging or discharging of the battery cell.

The battery cell includes an electrode assembly and an electrolytic solution, and the electrode assembly is composed of a positive electrode sheet, a negative electrode sheet and a separator. Operations of the battery cell mainly rely on movements of metal ions between the positive electrode sheet and the negative electrode sheet. The positive electrode sheet includes a positive current collector and a positive active material layer. The positive active material layer is coated on a surface of the positive current collector, and the current collector that is not coated with the positive active material layer protrudes from the current collector coated with the positive active material layer and is used as a positive tab. In an example of a lithium-ion battery, the material of the positive current collector may be aluminum, and the positive active material may be lithium cobalt oxide, lithium iron phosphate, ternary lithium, lithium manganate, or the like. The negative sheet includes a negative current collector and a negative active material layer. The negative active material layer is coated on a surface of the negative current collector, and the current collector that is not coated with the negative active material layer protrudes from the current collector coated with the negative active material layer and is used as a negative tab. A material of the negative current collector may be copper, and a material of the negative active material may be carbon, silicon, or the like. In order to ensure that no fusing occurs when a large current passes through, there are a plurality of positive tabs which are stacked together, and there are a plurality of negative tabs which are stacked together. A material of the separator may be polypropylene (PP) or polyethylene (PE), and the like. In addition, the electrode assembly may be a winding structure or a laminated structure, and the embodiments of the present application are not limited thereto.

In order to meet different power demands, the battery may include a plurality of battery cells, where the plurality of battery cells may be series-connected, parallel-connected or series-parallel connected. The series-parallel connection refers to a combination of series connection and parallel connection. Optionally, a plurality of battery cells may be firstly series-connected, parallel-connected or series-parallel connected to form a battery module, and then a plurality of battery modules are series-connected, parallel-connected or series-parallel connected to form a battery. That is, the plurality of battery cells may directly form a battery, or may firstly form battery modules, and then the battery modules form a battery. The battery is further provided in a power consumption device to provide electrical energy for the power consumption device.

The development of the battery technology is necessary to take into account design factors in multiple aspects simultaneously, such as energy density, cycle life, discharge capacity, C-rate, safety, etc. Among them, when an internal space of the battery is fixed, improving the utilization rate of the internal space of the battery is an effective measure to improve the energy density of the battery. However, while improving the utilization rate of the internal space of the battery, other parameters of the battery, such as thermal management, are also needed to be considered.

In view of this, embodiments of the present application provide a technical solution, in the battery, the thermal management component is provided to be connected to the first wall that has the largest surface area of each battery cell among a column of the plurality of battery cells arranged along the first direction, where the thermal management component includes a pair of heat conducting plates that are oppositely arranged along a second direction of the first wall and a flow passage between the pair of heat conducting plates, and in the second direction, the thickness D of the heat conducting plate and the size H of the flow passage satisfy: $0.01 \leq D/H \leq 25$. In this way, there is no need to provide beams and other structures in the middle of the box body of the battery, which can maximize the space utilization rate inside the battery, thereby improving the energy density of the battery; besides, the use of the above thermal management component can also ensure the thermal management in the battery. Thus, technical solutions of the embodiments of the present application could ensure the thermal management in the battery while improving the energy density of the battery, thereby improving the performance of the battery.

The technical solutions described in the embodiments of the present application are all applicable to various apparatuses using batteries, such as mobile phones, portable apparatus, notebook computers, electromobiles, electronic toys, electric tools, electric vehicles, ships and spacecrafts. For example, the spacecrafts include airplanes, rockets, space shuttles and spaceships, and the like.

It should be understood that the technical solutions described in the embodiments of the present application are not only applicable to the apparatus described above, but to all apparatus using batteries. However, for brief description, the following embodiments are all described by an example of an electric vehicle.

For example, as shown in FIG. 1, FIG. 1 is a schematic structural diagram of the vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 may be used as an operation power supply of the vehicle 1 for a circuit system of the vehicle 1, for example, for a working power demand of the vehicle 1 during startup, navigation and operation. In another embodiment of the present application, the battery 10 may be used not only as an operating power source for the vehicle 1 but a driving power source for the vehicle 1, replacing or partially replacing the fuel or natural gas to provide driving power for the vehicle 1.

Figure 2:
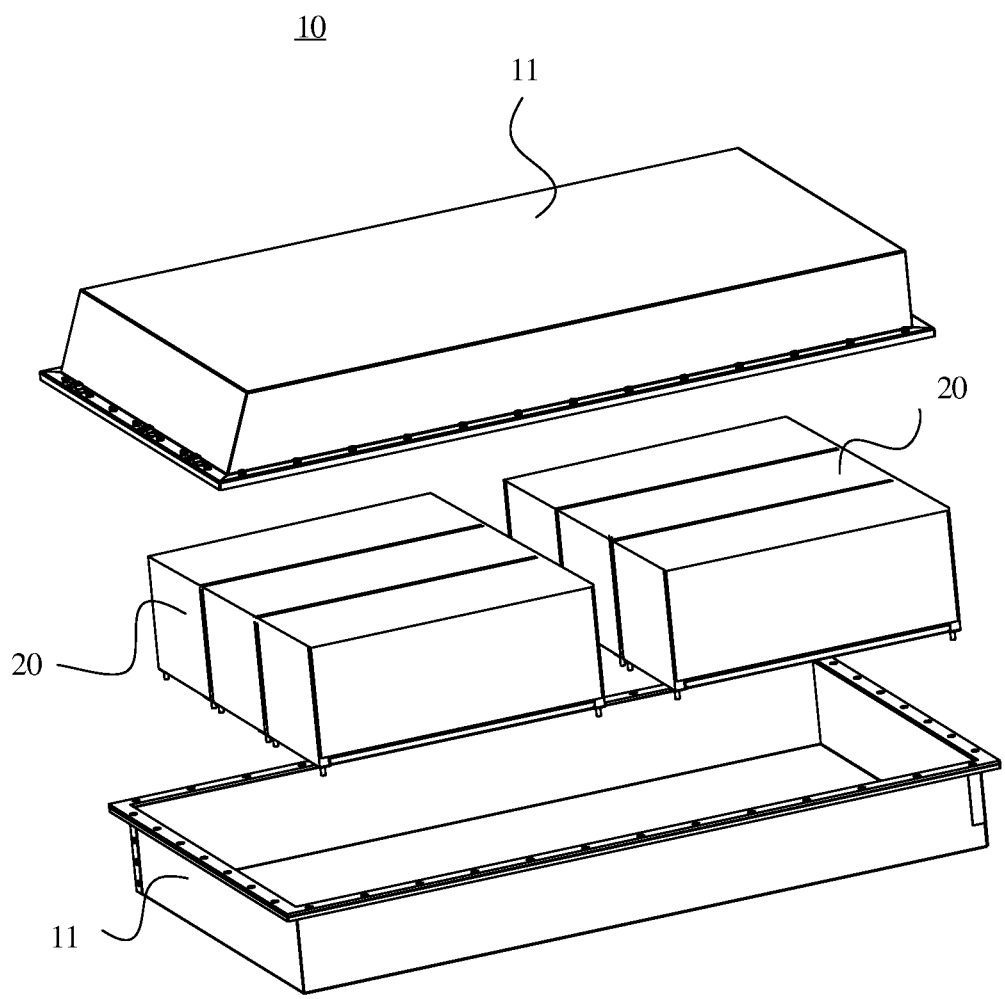
FIG. 2 is a schematic diagram of a battery according to an embodiment of the present application.

In order to satisfy different power demands, the battery 10 may include a plurality of battery cells. For example, as shown in FIG. 2, it is a schematic structural diagram of the battery 10 according to an embodiment of the present application. The battery 10 may include a plurality of battery cells 20. The battery 10 may further include a box body 11 with a hollow structure inside, and the plurality of battery cells 20 are accommodated in the box body 11. For example, the plurality of battery cells 20 are connected in series or in parallel or in a hybrid and are then placed in the box body 11.

Optionally, the battery 10 may also include other structures, which will not be described in detail herein. For example, the battery 10 may also include a busbar component. The busbar component is configured to implement electric connection among the plurality of battery cells 20, such as parallel connection, series connection or series-parallel connection. Specifically, the busbar component may implement an electrical connection between the battery cells 20 by connecting electrode terminals of the battery cells 20. Further, the busbar component may be fixed to the electrode terminals of the battery cells 20 by means of welding. Electric energy of the plurality of battery cells 20 may be further led out through an electrically conductive mechanism passing through the case. Optionally, electrically conductive mechanism may also belong to the busbar component.

According to different power requirements, the number of the battery cells 20 may be set to any value. The plurality of battery cells 20 may be series-connected, parallel-connected or series-parallel connected to implement larger capacity or power. Since there may be many battery cells 20 included in each battery 10, the battery cells 20 may be provided in groups for convenience of installation, and each group of battery cells 20 constitutes a battery module. The number of the battery cells 20 included in the battery module is not limited and may be set as required. The battery may include a plurality of battery modules, and these battery modules may be series-connected, parallel-connected or series-parallel connected.

Figure 3:
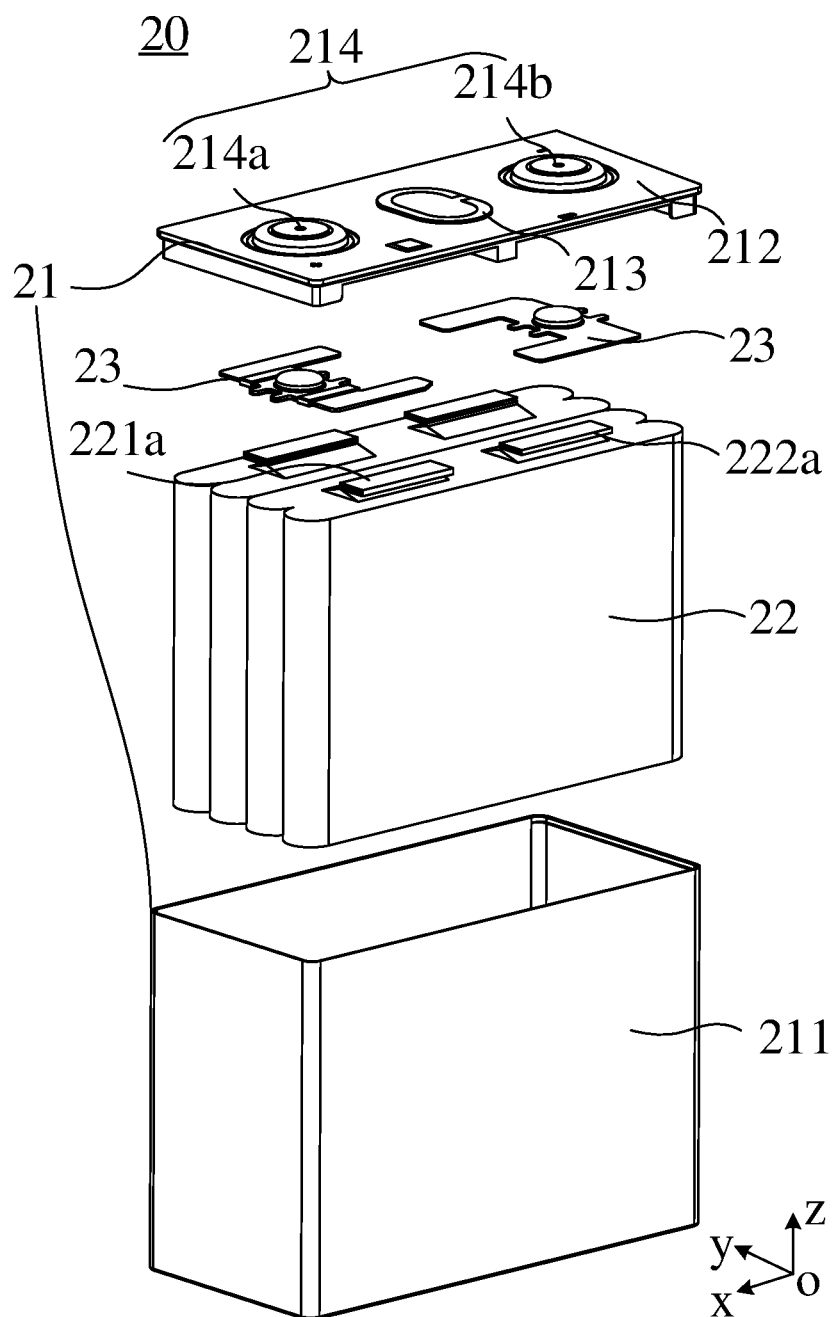
FIG. 3 is a schematic diagram of a battery cell according to an embodiment of the present application.

FIG. 3 is a schematic structural diagram of the battery cell 20 according to an embodiment of the present application. The battery cell 20 includes one or more electrode assemblies 22, a housing 211 and a cover plate 212. The housing 211 and the cover plate 212 form a shell or a battery case 21. A wall of the housing 211 and the cover plate 212 are both referred to as a wall of the battery cell 20, where for a cuboid battery cell 20, the walls of the housing 211 includes a bottom wall and four side walls. The housing 211 is shaped according to a shape of one or more electrode assemblies 22 after combination. For example, the housing 211 may be a hollow cuboid, cube or cylinder, and one surface of the housing 211 has an opening such that one or more electrode assemblies 22 may be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end surface does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connection member 23, or also referred to as a current collection member 23, which is located between the cover plate 212 and the electrode assembly 22 and configured to electrically connect the electrode assembly 22 to the electrode terminal 214.

As shown in FIG. 3, each electrode assembly 22 has a first tab 221a and a second tab 222a. The first tab 221a and the second tab 222a have opposite polarities. For example, when the first tab 221a is a positive tab, the second tab 222a is a negative tab. The first tab 221a of the one or more electrode assemblies 22 is connected to an electrode terminal through a connection member 23, and the second tab 222a of the one or more electrode assemblies 22 is connected to the other electrode terminal through the other connection member 23. For example, the positive electrode terminal 214a is connected to the positive tab via a connection member 23, and the negative electrode terminal 214b is connected to the negative tab via the other connection member 23.

In the battery cell 20, according to actual usage requirements, there may be a single or a plurality of electrode assemblies 22. As shown in FIG. 3, there are four independent electrode assemblies 22 in the battery cell 20.

A pressure relief mechanism 213 may also be provided on the battery cell 20. The pressure relief mechanism 213 is configured to be actuated when an internal pressure or temperature of the battery cell 20 reaches a threshold, to relieve the internal pressure or temperature.

The pressure relief mechanism 213 may be in various possible pressure relief structures, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

Figure 4:
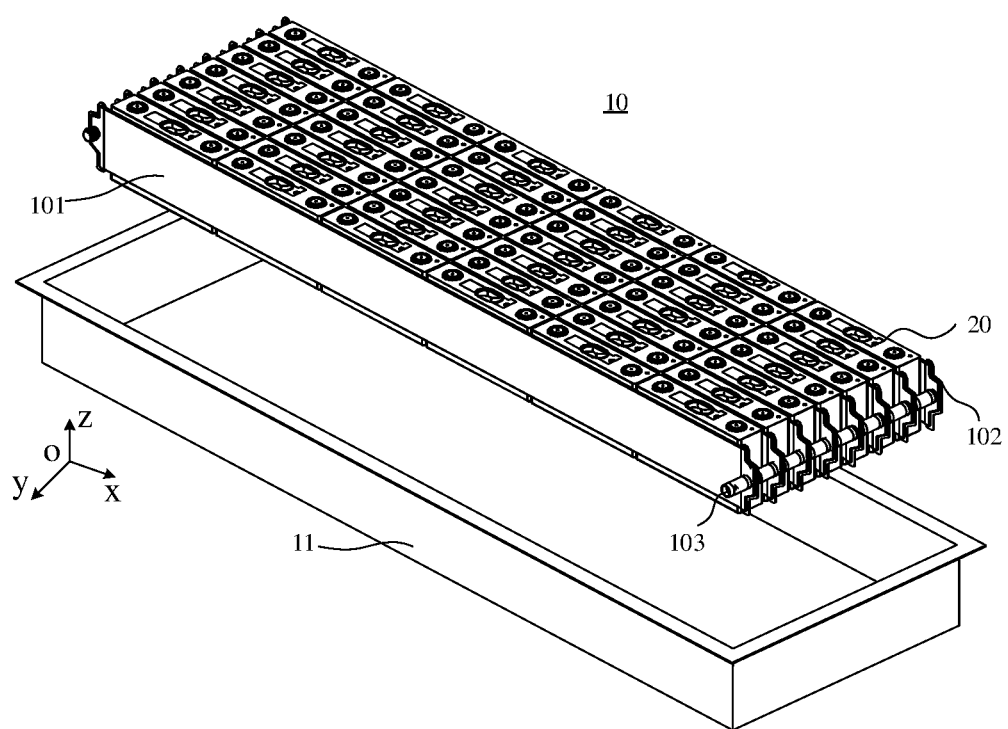
FIG. 4 is a schematic diagram of a battery according to an embodiment of the present application.

FIG. 4 shows a schematic structural diagram of the battery 10 according to an embodiment of the present application.

The battery 10 includes a plurality of battery cells 20 arranged along a first direction x and a thermal management component 101.

The first direction x is the arrangement direction of a column of battery cells 20 in the battery 10. That is, the column of battery cells 20 in the battery 10 are arranged along the direction x.

Figure 5:
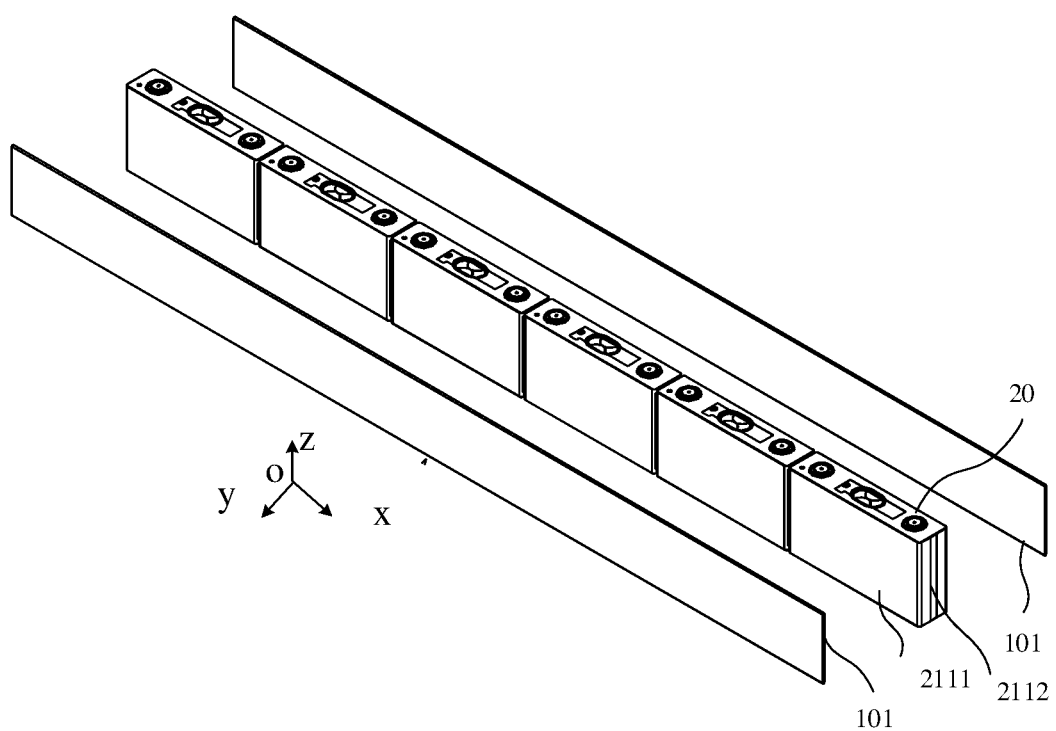
FIG. 5 is an exploded diagram of a column of battery cells and thermal management components in an embodiment of the present application.
Figure 6:
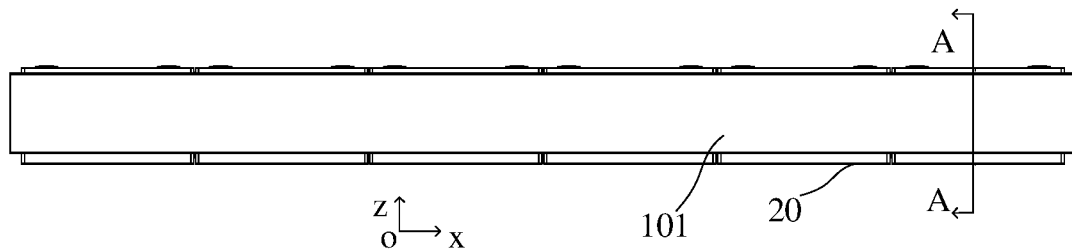
FIG. 6 is a planar schematic diagram of a column of battery cells and thermal management components in an embodiment of the present application.
Figure 7:
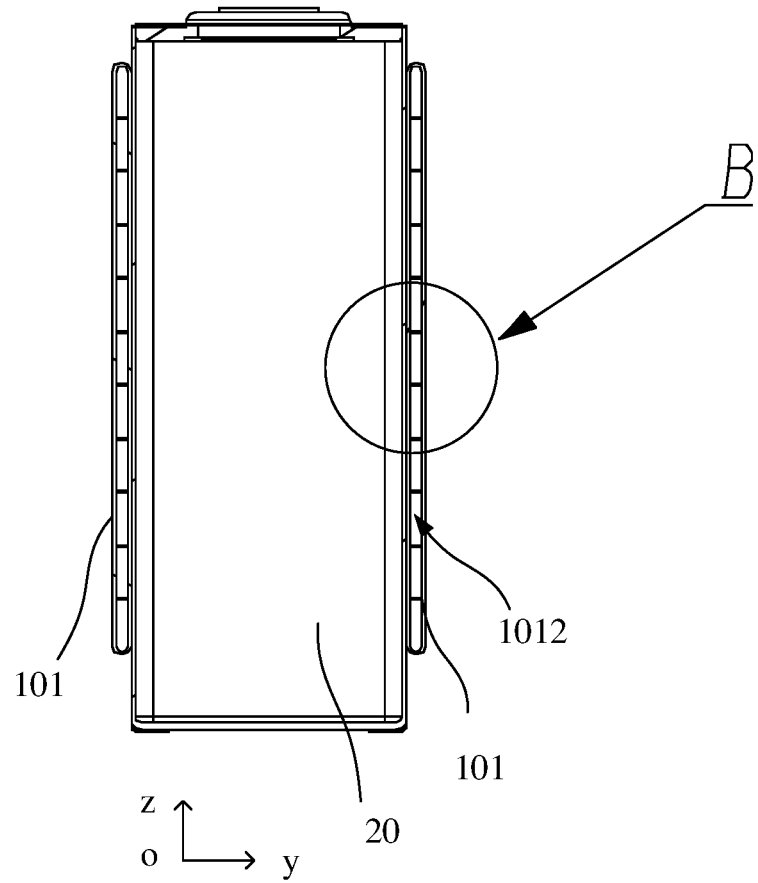
FIG. 7 is a sectional schematic view taken along A-A in FIG. 6.

FIG. 5 shows an exploded diagram of the column of battery cells 20 and thermal management components 101; FIG. 6 is a planar schematic diagram of the column of battery cells 20 and thermal management components 101; FIG. 7 is a sectional schematic view taken along A-A in FIG. 6; and FIG. 8 is an enlarged view of the part B in FIG. 7.

The thermal management component 101 extends along the first direction x and is connected to a first wall 2111 of each battery cell 20 among the plurality of battery cells 20, and the first wall 2111 is a wall of the battery cell 20 that has the largest surface area.

The battery cell 20 may include a plurality of walls, and the first wall 2111 that has the largest surface area of the battery cell 20 is connected to the thermal management component 101. That is, the first wall 2111 of the battery cell 20 faces the thermal management component 101, i.e., the first wall 2111 of the battery cell 20 are parallel to the first direction x.

Figure 8:
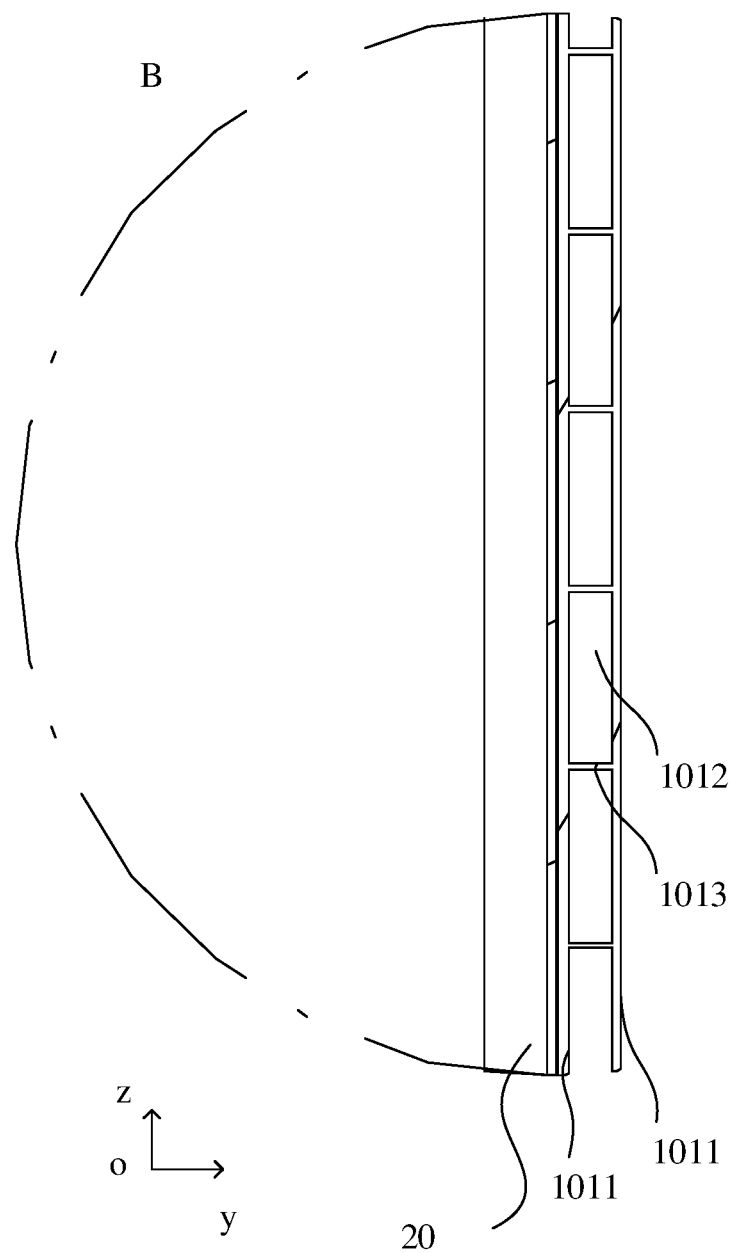
FIG. 8 is an enlarged view of the part B in FIG. 7.

As shown in FIG. 7 and FIG. 8, the thermal management component 101 includes a pair of heat conducting plates 1011 that are oppositely arranged along a second direction y and a flow passage 1012 located between the pair of heat conducting plates 1011, the flow passage 1012 is configured to accommodate a fluid to adjust a temperature of the battery cell 20, and the second direction y is vertical to the first wall 2111.

The thermal management component 101 is configured to accommodate a fluid to adjust temperatures of the plurality of battery cells 20. The fluid may be a liquid or a gas, and the temperature adjustment means heating or cooling the plurality of battery cells 20. In a case of cooling or lowering the temperature of the battery cells 20, the flow passage 1012 is configured to accommodate a cooling medium to adjust the temperatures of the plurality of battery cells 20. In this case, the thermal management component 101 may also be called a cooling component or a cooling plate, or the like. The fluid accommodated in the flow passage 1012 may also be referred to as a cooling medium or a cooling fluid, and more specifically, may be referred to as a cooling liquid or a cooling gas. In addition, the thermal management component 101 may also be used for heating, which is not limited in the embodiments of the present application. Optionally, the fluid may flow in a circulating manner to achieve a better temperature adjustment effect. Optionally, the fluid may be water, a mixture of water and ethylene glycol, refrigerant, air, or the like. Optionally, the thermal management component 101 is provided with a current collector 102 and a pipe 103 at both ends in the first direction x, the pipe 103 is used for conveying the fluid, and the current collector 102 is used for collecting the fluid.

In the second direction y, a thickness D of the heat conducting plate 1011 and a size H of the flow passage 1012 satisfy: $0.01 \leq D/H \leq 25$.

In an embodiment of the present application, in the battery 10, the thermal management component 101 is provided to be connected to the first wall 2111 that has the largest surface area of each battery cell 20 among a column of the plurality of battery cells 20 arranged along the first direction x. In this way, there is no need to provide beams and other structures in the middle of the box body 11 of the battery 10, which can maximize the space utilization rate inside the battery, thereby improving the energy density of the battery 10.

Correspondingly, in order to ensure the performance of the battery 10, the thermal management component 101 needs to take into account the requirements of strength and thermal management performance.

In an embodiment of the present application, in the second direction y, when the thickness D of the heat conducting plate 1011 and the size H of the flow passage 1012 satisfy: $0.01 \leq D/H \leq 25$, both the strength and the thermal management performance requirements can be taken into account.

Specifically, when the size H of the flow passage 1012 is large, a flow resistance of the fluid in the flow passage 1012 is low, which can improve a heat exchange amount per unit time of the thermal management component 101; when the thickness D of the heat conduction plate 1011 is relatively large, the thermal management component 101 has high strength. When D/H is less than 0.01, the size H of the flow passage 1012 is big enough, but takes up too much space; or under the given space of the thermal management component 101, the thickness D of the heat conducting plate 1011 may be too thin, resulting in insufficient strength, for example, vibration and shock requirements of the battery 10 cannot be met, and even the thermal management component 101 is crushed when the battery is firstly assembled. When $D/H \geq 25$, the thickness D of the heat conducting plate 1011 is thick enough, but under the given space of the thermal management component 101, it may result in that the size H of the flow passage 1012 is too small, and the flow resistance of the fluid in the flow passage 1012 increases, and a heat exchange performance is deteriorated or the flow passage 1012 is blocked during use. Besides, since the thickness of the wall of the heat conducting plate 1011 is too large, a force generated by the expansion of the battery cell 20 cannot satisfy the crushing force on the thermal management component 101 corresponding to the expansion space required by the battery cell 20, that is, the thermal management component 101 cannot release the expansion space required by the battery cell 20 in time, which will accelerate the capacity reduction of the battery cell 20. Therefore, the thickness D of the heat conducting plate 1011 and the size H of the flow passage 1012 satisfy: $0.01 \leq D/H \leq 25$, both the strength and the thermal management performance requirements can be taken into account simultaneously to ensure the performance of the battery 10.

In an embodiment of the present application, in the battery 10, the thermal management component 101 is provided to be connected to the first wall 2111 that has the largest surface area of each battery cell 20 among a column of the plurality of battery cells 20 arranged in the first direction x, where the thermal management component 101 includes a pair of heat conducting plates 1011 that are oppositely arranged along a second direction y of the first wall 2111 and a flow passage 1012 between the pair of heat conducting plates 1011, and in the second direction y, the thickness D of the heat conducting plate 1011 and the size H of the flow passage 1012 satisfy: $0.01 \leq D/H \leq 25$. In this way, there is no need to provide beams and other structures in the middle of the box body 11 of the battery 10, which can maximize the space utilization rate inside the battery 10, thereby improving the energy density of the battery 10; besides, the use of the above thermal management component 101 can also ensure the thermal management in the battery 10. Thus, technical solutions of the embodiments of the present application could ensure the thermal management in the battery 10 while improving the energy density of the battery 10, thereby improving the performance of the battery 10.

Optionally, when $0.01 \leq D/H \leq 0.1$, the fluid may be a solid-liquid phase change material or a liquid working substance, an outer layer of the thermal management component 101 may be made of a film-like material as a skin, and the interior can be filled with a skeleton structure for reinforcement. This solution can be used in the case where the requirement of strength is relatively low or the compressibility of the thermal management component 101 is relatively high.

Optionally, in the range of $0.01 \leq D/H \leq 0.1$, convection heat exchange using a fluid working substance or vapor-liquid phase change cooling scheme can be adopted inside the thermal management component 101, and the liquid working substance is used as the heat exchange medium to ensure the heat transfer performance of the thermal management component 101.

Optionally, when $0.01 \leq D/H \leq 25$, the thermal management component 101 may use a vapor-liquid phase change cooling scheme, and the overall pressure may be increased by adjusting an interior gap to ensure that the working medium exists in the form of liquid inside the thermal management component 101 so as to prevent coexistence of the two states of vapor and liquid caused by pressure loss, and provide the heat exchange performance Besides, the thickness D of the heat conducting plate 1011 is thick enough to prevent the thermal management component 101 from breaking due to vaporization of the internal working medium and the increase of pressure during being heated.

Optionally, in an embodiment of the present application, the thickness D of the heat conducting plate 1011 and the size H of the flow passage 1012 satisfy: $0.05 \leq D/H \leq 15$, and further satisfy $0.1 \leq D/H \leq 1$, so as to better take into account space, strength and thermal management, thereby further improving the performance of the battery 10.

Optionally, in an embodiment of the present application, a size W of the thermal management component 101 in the second direction y is 0.3 to 100 mm.

W is the total thickness of the thermal management component 101, that is, $W=2*D+H$. If W is too large, the thermal management component 101 will take up too much space, and if W is too small, it will result in too low strength or too narrow flow passage and affect the thermal management performance. Therefore, when the total thickness W of the thermal management component 101 is 0.3 to 100 mm, the thermal management component 101 can take into account the space, the strength and the thermal management to ensure the performance of the battery 10.

Optionally, in an embodiment of the present application, the thickness d of the heat conducting plate is 0.1 to 25 mm.

If the thickness D of the heat conducting plate 1011 is too large, the heat conducting plate 1011 will take up too much space and the thermal management component 101 will not be able to give up the expansion space required by the battery cell 20, and if the D is too small, it will result in low strength. Therefore, when the thickness D of the heat conducting plate 1011 is 0.1 to 25 mm, the thermal management component 101 may take into account the space, the strength and the expansion requirements of the battery cell 20 to ensure the performance of the battery 10.

Optionally, in an embodiment of the present application, the size H of the flow passage 1012 is 0.1 to 50 mm.

Specifically, the size H of the flow passage 1012 needs to be at least larger than the particle size of impurities that may appear inside, so as to prevent blockage during application, and if the size H of the flow passage 1012 is too small, the flow resistance of the fluid in the flow passage 1012 increases, and the heat exchange performance is deteriorated, so the size H of the flow passage 1012 is not less than 0.1 mm. If the size H of the flow passage 1012 is too large, it will take up too much space or not have enough strength. Therefore, when the size H of the flow passage 1012 is 0.1 to 50 mm, the space, the strength and the thermal management performance can be taken into account to ensure the performance of the battery 10.

Optionally, in an embodiment of the present application, the size W of the thermal management component 101 in the second direction y and an area A of the first wall 2111 satisfy: $0.03 \text{ mm}^{-1} \leq W/A*1000 \leq 2 \text{ mm}^{-1}$.

If W and A satisfy the above conditions, and the heat exchange performance requirements and the size and space requirements of the battery cell 20 can be met. Specifically, when the area A of the first wall 2111 of the battery cell 20 is relatively large, the cooling area is relatively large, which can reduce the heat transfer resistance from the thermal management component 101 to the surface of the battery cell 20; and when the total thickness of the thermal management component 101 is relatively large, the strength can be increased. If $W/A*1000$ is less than $0.03 \text{ mm}^{-1}$, the area A of the first wall 2111 of the battery cell 20 is large enough, but the thermal management component 101 is too thin, resulting in insufficient strength, and the thermal management component 101 may have problems, such as damage or crack during use. If $W/A*1000$ is greater than 2, the thermal management component 101 is thick enough, but the area A of the first wall 2111 of the battery cell 20 is too small, and the cooling surface that the thermal management component 101 may supply to the battery cell 20 is insufficient, having the risk that the cooling needs of the battery cell 20 cannot be met. Therefore, when the total thickness W of the thermal management component 101 and the area A of the first wall 2111 satisfy $0.03 \text{ mm}^{-1} \leq W/A*1000 \leq 2 \text{ mm}^{-1}$, the strength and thermal management performance requirements can be taken into account to ensure the performance of the battery 10.

Optionally, in an embodiment of the present application, as shown in FIG. 8, the thermal management component 101 may further include a rib 1013 provided between the pair of heat conducting plates 1011, and the rib 1013 and the pair of heat conducting plates 1011 form the flow passage 1012. The rib 1013 can also increase the strength of the thermal management component 101. The number of the rib 1013 may be set according to the requirements of the flow passage 1012 and the strength. As shown in FIG. 8, the rib 1013 may be vertical to the heat conducting plate 1011, in this case, the thermal management component 101 may bear a greater pressure. Optionally, the rib 1013 can be a special shape, such as a C shape, a wave shape or a cross shape, etc., which can effectively absorb expansion, and can also increase turbulence and enhance a heat exchange effect.

Optionally, in an embodiment of the present application, an angle formed of the rib 1013 and the heat conducting plate 1011 may be an acute angle. That is to say, the rib 1013 are not vertical to the heat conducting plate 1011. In this case, in the second direction y, the thermal management component 101 can have a relatively large space for compression, thereby providing a relatively larger space for the expansion of the battery cell 20.

Optionally, in an embodiment of the present application, a thickness X of the rib 1013 is not less than $(-0.0005*F+0.4738)$mm, where F is a tensile strength of a material of the rib 1013, in MPa. That is, the thickness X of the ribs 1013 may be at least $(-0.0005*F+0.4738)$mm.

The thickness X of the rib 1013 is related to the tensile strength of the material of the rib 1013. According to the above relational expression, in order to meet stress requirements of the thermal management component 101, materials with higher strength are selected, and the thickness X of the internal rib 1013 can be thinner, thereby saving the space and improving the energy density. Optionally, the thickness X of the rib 1013 may be 0.2 mm to 1 mm.

Optionally, in an embodiment of the present application, the battery cell 20 includes two first walls 2111 that are oppositely arranged in the second direction y and two second walls 2112 that are oppositely arranged in the first direction x, where in the first direction x, the second walls 2112 of two adjacent battery cells 20 are opposite. That is, for the prismatic battery cell 20, the large side thereof, i.e., the first wall 2111, is connected to the thermal management component 101, and the small side thereof, i.e., the second wall 2112, is connected to the second wall 2112 of the adjacent battery cell 20, so that the battery cells 20 are arranged in a column in the first direction x. In this way, a first wall 2111 with a large area is used to connect with the thermal management component 101, which is beneficial to the heat exchange of the battery cells 20 and ensures the performance of the battery 10.

Optionally, in an embodiment of the present application, the battery 10 includes a plurality of columns of the plurality of battery cells 20 arranged in the first direction x and the plurality of thermal management components 101, where the plurality of columns of battery cells 20 and the plurality of thermal management components 101 are alternately arranged in the second direction y. That is, the plurality of columns of battery cells 20 and the plurality of thermal management components 101 may be arranged in the order of a thermal management components 101, a column of battery cells 20, a thermal management components 101 . . . , or, a column of battery cells 20, a thermal management components 101, a column of battery cells 20 . . . , in this way, the plurality columns of battery cells 20 and the plurality of thermal management components 101 are connected to each other to form as a whole that is accommodated in the box body 11, which can not only perform effectively thermal management of each column of battery cells 20, but ensure the overall structural strength of the battery 10, thereby improving the performance of the battery 10.

Optionally, in an embodiment of the present application, the battery 10 may include a plurality of battery modules. The battery module includes at least one column of the plurality of battery cells 20 arranged along the first direction x and at least one thermal management component 101, and the at least one column of battery cells 20 and the at least one of thermal management component 101 are alternately arranged in the second direction y. That is, for each battery module, the column of battery cells 20 and the thermal management component 101 are alternately arranged in the second direction y, and the plurality of battery modules are accommodated in the box body 11 to form the battery 10. Optionally, the plurality of battery modules are arranged along the second direction y, and there is a gap between adjacent battery modules.

Optionally, in an embodiment of the present application, the thermal management component 101 is bonded to the first wall 2111. That is, the thermal management component 101 and the battery cell 20 may be fixedly connected by bonding, such as boding by the structural glue, but this is not limited by the embodiments of the present application.

Optionally, the battery cell 20 may be bonded and fixed to the box body 11. Optionally, adjacent battery cells 20 in each column of battery cells 20 may also be bonded, for example, the second walls 2112 of adjacent battery cells 20 are bonded by the structural glue, but this is not limited by the embodiments of the present application. The fixing effect of the battery cells 20 may be further enhanced by bonding and fixing adjacent battery cells 20 in each column of battery cells 20.

It should be understood that relevant parts in each embodiment of the present application may be referred to each other, and for the sake of brevity, details are not described herein again.

An embodiment of the present application further provides a power consumption device, which may include the battery 10 in the above-mentioned embodiments. Optionally, the power consumption device may be a vehicle 1, a ship or a spacecraft, etc., but this is not limited by the embodiments of the present application.

The battery 10 and the power consumption device of the embodiments of the present application are described above, and a method and device for producing a battery of the embodiments of the present application will be described below. For the parts that are not described in detail, reference is made to the foregoing embodiments.

Figure 9:
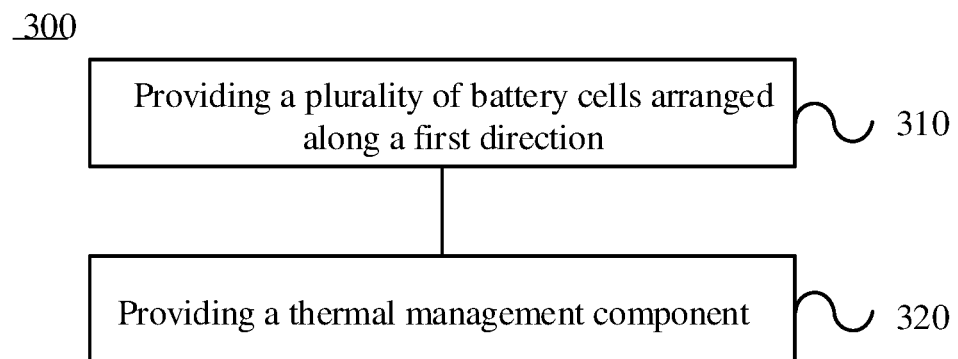
FIG. 9 is a schematic flowchart of a method for producing a battery according to an embodiment of the present application.

FIG. 9 shows a schematic flowchart of a method 300 for producing a battery according to an embodiment of the present application. As shown in FIG. 9, the method 300 may include:

310, providing a plurality of battery cells 20 arranged along a first direction x;

320, providing a thermal management component 101, the thermal management component 101 extending along the first direction x and being connected to a first wall 2111 of each battery cell 20 among the plurality of battery cells 20, the first wall 2111 being a wall that has the largest surface area of the battery cell 20, the thermal management component 101 including a pair of heat conducting plates 1011 that are oppositely arranged along a second direction y and a flow passage 1012 located between the pair of heat conducting plates 1011, the flow passage 1012 being configured to accommodate a fluid to adjust temperatures of the battery cells 20, and the second direction y being vertical to the first wall 2111, where in the second direction y, a thickness D of the heat conducting plate 1011 and a size H of the flow passage 1012 satisfy: 0.01≤D/H≤25.

Figure 10:
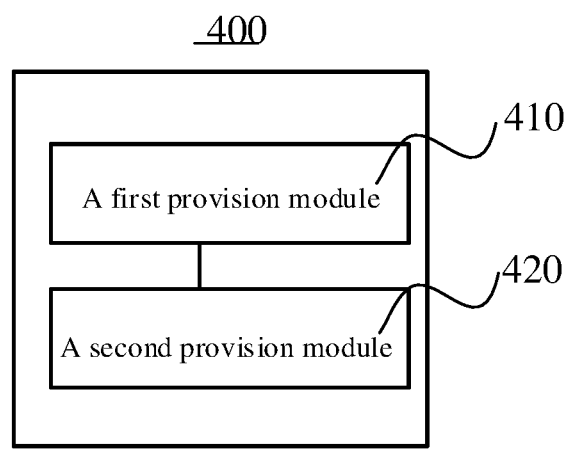
FIG. 10 is a schematic block diagram of a device for producing a battery according to an embodiment of the present application.

FIG. 10 is a schematic block diagram of a device 400 for producing a battery according to an embodiment of the present application. As shown in FIG. 10, the device 400 for producing a battery may including:

a first provision module 410, configured to provide a plurality of battery cells 20 arranged along the first direction x;

a second provision module 420 configured to provide a thermal management component 101, the thermal management component 101 extending along the first direction x and being connected to a first wall 2111 of each battery cell 20 among the plurality of battery cells 20, the first wall 2111 being a wall that has the largest surface area of the battery cell 20, the thermal management component 101 including a pair of heat conducting plates 1011 that are oppositely arranged along a second direction y and a flow passage 1012 located between the pair of heat conducting plates 1011, the flow passage 1012 being configured to accommodate a fluid to adjust temperatures of the battery cells 20, and the second direction y being vertical to the first wall 2111, where in the second direction y, a thickness D of the heat conducting plate 1011 and a size H of the flow passage 1012 satisfy: 0.01≤D/H≤25.

Hereinafter, embodiments of the present application are illustrated. The embodiments described below are exemplary, only used to explain the present application, and should not be construed as a limitation to the present application. If no specific technique or condition is indicated in the embodiments, the technique or condition described in the literature in the art or the product specification is used.

Simulation tests on heating rate and deformation force of the thermal management component 101 are carried out using the battery cell 20 and the thermal management component 101 shown in the accompanying drawings, and the test results are shown in Table 1. L2 in Table 1 is the size of the battery cell 20 in the first direction x, L3 is the size of the battery cell 20 in the second direction y, L1 is the size of the first wall 2111 of the battery cell 20 in the third direction z, and the third direction is vertical to the first direction x and the second direction y.

TABLE 1

| L1 mm | L2 mm | L3 mm | W mm | D mm | H mm | D/H | W/A*1000 mm$^{-1}$ | Heating Rate °C./min | Deformation Force N |
|---|---|---|---|---|---|---|---|---|---|
| 71 | 1000 | 26.5 | 4 | 1.95 | 0.1 | 19.5 | 0.056338028 | <0.5 | >100000 |
| 100 | 960 | 26.5 | 4 | 1.8 | 0.4 | 4.5 | 0.041666667 | <0.5 | >100000 |
| 71 | 120 | 26.5 | 5 | 2.45 | 0.1 | 24.5 | 0.58685446 | <0.5 | >100000 |
| 71 | 120 | 26.5 | 8 | 3 | 2 | 1.5 | 0.938967136 | <0.5 | >100000 |
| 85.9 | 120 | 12.5 | 3 | 1.45 | 0.1 | 14.5 | 0.291036088 | <0.5 | >100000 |
| 91 | 148 | 26.5 | 3 | 1.45 | 0.1 | 14.5 | 0.222750223 | <0.5 | >100000 |
| 112.5 | 148 | 85.8 | 5 | 2.25 | 0.5 | 4.5 | 0.3003003 | <0.5 | >100000 |
| 95 | 148 | 52 | 5 | 2.25 | 0.5 | 4.5 | 0.355618777 | <0.5 | >100000 |
| 85 | 173 | 42 | 4 | 1.75 | 0.5 | 3.5 | 0.272016321 | <0.5 | [10000, 100000] |
| 199.7 | 173.6 | 53.5 | 4 | 1.75 | 0.5 | 3.5 | 0.115380444 | <0.5 | [10000, 100000] |
| 201.7 | 173.6 | 28.6 | 12 | 2 | 8 | 0.25 | 0.342709093 | [0.5, 1.6] | [10000, 100000] |
| 199.7 | 173.6 | 53.5 | 10 | 1.5 | 7 | 0.214285714 | 0.28845111 | [0.5, 1.6] | [10000, 100000] |
| 97.5 | 148 | 28.5 | 3 | 0.5 | 2 | 0.25 | 0.207900208 | [0.5, 1.6] | [10000, 100000] |
| 102.85 | 148 | 79 | 3 | 0.4 | 2.2 | 0.181818182 | 0.197085759 | [0.5, 1.6] | [10000, 100000] |
| 97 | 148 | 79 | 3 | 0.4 | 2.2 | 0.181818182 | 0.208971858 | [0.5, 1.6] | [10000, 100000] |
| 199.7 | 173.6 | 71.25 | 4 | 1 | 2 | 0.5 | 0.115380444 | [0.5, 1.6] | [10000, 100000] |
| 30 | 200 | 10 | 2 | 0.625 | 0.75 | 0.833333333 | 0.333333333 | [0.5, 1.6] | [10000, 100000] |
| 55 | 55 | 13.5 | 5 | 0.5 | 4 | 0.125 | 1.652892562 | [0.5, 1.6] | [10000, 100000] |
| 63.4 | 70 | 35 | 6 | 1 | 4 | 0.25 | 1.351960342 | [0.5, 1.6] | [10000, 100000] |
| 112.5 | 203 | 44 | 6 | 0.25 | 5.5 | 0.045454545 | 0.26272578 | [0.5, 1.6] | <10000 |
| 112.5 | 203 | 88 | 6 | 0.25 | 5.5 | 0.045454545 | 0.26272578 | [0.5, 1.6] | <10000 |
| 91 | 148 | 26.5 | 0.3 | 0.1 | 0.1 | 1 | 0.022275022 | <0.5 | <10000 |
| 112.5 | 194 | 48 | 4 | 0.2 | 3.6 | 0.055555556 | 0.18327606 | <0.5 | <10000 |
| 112.5 | 194 | 70.7 | 4 | 0.2 | 3.6 | 0.055555556 | 0.18327606 | <0.5 | <10000 |
| 200 | 200 | 85.8 | 60 | 5 | 50 | 0.1 | 1.5 | [0.5, 1.6] | >100000 |

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, comprising:
   a plurality of battery cells arranged along a first direction; and
   a thermal management component, extending along the first direction and being connected to a first wall of each battery cell among the plurality of battery cells, the first wall being a wall that has the largest surface area of the battery cell, the thermal management component comprising a pair of heat conducting plates that are oppositely arranged along a second direction and a flow passage located between the pair of heat conducting plates, the flow passage being configured to accommodate a fluid to adjust a temperature of the battery cell, and the second direction being vertical to the first wall,
   wherein in the second direction, a thickness D of one of the pair of heat conducting plates and a size H of the flow passage satisfy: $0.01 \leq D/H \leq 25$.

2. The battery according to claim 1, wherein the thickness D of the heat conducting plate and the size H of the flow passage satisfy: $0.05 \leq D/H \leq 15$.

3. The battery according to claim 1, wherein a size W of the thermal management component in the second direction is 0.3 to 100 mm.

4. The battery according to claim 1, wherein the thickness D of the heat conducting plate is 0.1 to 25 mm.

5. The battery according to claim 1, wherein the size H of the flow passage is 0.1 to 50 mm.

6. The battery according to claim 3, wherein the size W of the thermal management component in the second direction and an area A of the first wall satisfy: $0.03 \text{ mm}^{-1} < W/A*1000 < 2 \text{ mm}^{-1}$.

7. The battery according to claim 1, wherein the thermal management component further comprises a rib provided between the pair of heat conducting plates, and the rib and the pair of heat conducting plates form the flow passage.

8. The battery according to claim 7, wherein an angle formed of the rib and the heat conducting plate is an acute angle.

9. The battery according to claim 7, wherein a thickness X of the rib is not less than $(-0.0005*F+0.4738)$ mm, wherein F is a tensile strength of a material of the rib.

10. The battery according to claim 1, wherein the battery cell comprises two first walls that are oppositely arranged in the second direction and two second walls that are oppositely arranged in the first direction, wherein in the first direction, the second walls of two adjacent battery cells are opposite.

11. The battery according to claim 1, wherein the battery comprises a plurality of columns of the plurality of battery cells arranged in the first direction and the the number of the thermal management component is set to plurality, wherein the plurality of columns of battery cells and the plurality of thermal management components are alternately arranged in the second direction.

12. The battery according to claim 1, wherein the thermal management component is bonded to the first wall.

13. A power consumption device, comprising: the battery according to claim 1, the battery being configured to provide electric energy.

14. A method for producing a battery, comprising:
    providing a plurality of battery cells arranged in a first direction;
    providing a thermal management component, the thermal management component extending along the first direction and being connected to a first wall of each battery cell among the plurality of battery cells, the first wall being a wall that has the largest surface area of the battery cell, the thermal management component comprising a pair of heat conducting plates that are oppositely arranged along a second direction and a flow passage located between the pair of heat conducting plates, the flow passage being configured to accommodate a fluid to adjust a temperature of the battery cell, and the second direction being vertical to the first wall,
    wherein in the second direction, a thickness D of one of the pair of heat conducting plates and a size H of the flow passage satisfy: $0.01 \leq D/H \leq 25$.

15. A device for producing a battery, comprising:
    a first provision module, configured to provide a plurality of battery cells arranged along a first direction;
    a second provision module configured to provide a thermal management component, the thermal management component extending along the first direction and being connected to a first wall of each battery cell among the plurality of battery cells, the first wall being a wall that has the largest surface area of the battery cell, the thermal management component comprising a pair of heat conducting plates that are oppositely arranged along a second direction and a flow passage located between the pair of heat conducting plates, the flow passage being configured to accommodate a fluid to adjust a temperature of the battery cell, and the second direction being vertical to the first wall, wherein in the second direction, a thickness D of one of the pair of heat conducting plates and a size H of the flow passage satisfy: $0.01 \leq D/H \leq 25$.

* * * * *